United States Patent [19]
Hefner, Jr. et al.

[11] Patent Number: 4,945,138

[45] Date of Patent: Jul. 31, 1990

[54] STYRYLAZA VINYL ESTERS

[75] Inventors: Robert E. Hefner, Jr.; John W. Robinson, both of Lake Jackson, Tex.

[73] Assignee: The Dow Chemical Company, Midland, Mich.

[21] Appl. No.: 317,267

[22] Filed: Feb. 28, 1989

Related U.S. Application Data

[62] Division of Ser. No. 101,047, Sep. 25, 1987, Pat. No. 4,851,483.

[51] Int. Cl.$^5$ .............................................. C08G 8/10
[52] U.S. Cl. ................................. 525/502; 525/507; 525/922; 526/263; 526/273; 528/96; 528/112; 528/250; 546/342; 546/268
[58] Field of Search ...................... 525/502, 507, 922; 526/273; 528/96, 112, 250; 546/268, 342

*Primary Examiner*—Joseph L. Schofer
*Assistant Examiner*—A. H. Walker

[57] ABSTRACT

Vinyl ester resins of substituted epoxidized hydroxystyrylaza compounds are disclosed. These vinyl esters may be combined with various reactive monomers, prepolymers or polymers and cured to give a combination of high mechanical strength and glass transition temperature.

2 Claims, No Drawings

STYRYLAZA VINYL ESTERS

CROSS-REFERENCE TO RELATED APPLICATION

This is a divisional, of application Ser. No. 101,047, filed Sept. 25, 1987, now U.S. Pat. No. 4,851,483.

BACKGROUND OF THE INVENTION

The present invention provides novel vinyl esters of epoxidized hydroxystyrylaza compounds, as well as cured compositions prepared from said vinyl esters.

Vinyl esters are the reaction product of about equivalent amounts of a monounsaturated monocarboxylic acid and a polyepoxide. One class of vinyl esters is described in U.S. Pat. No. 3,367,992 where dicarboxylic acid half esters of hydroxyalkyl acrylates or methacrylates are reacted with polyepoxide resins. Bowen in U.S. Pat. Nos. 3,066,112 and 3,179,623 describes the preparation of vinyl esters from monocarboxylic acids such as acrylic and methacrylic acid. Bowen also describes alternate methods of preparation wherein a glycidyl methacrylate or acrylate is reacted with the sodium salt of a dihydric phenol such as bisphenol A. Vinyl ester resins based on epoxy novolac resins are described in U.S. Pat. No. 3,301,743 to Fekete et al. Fekete et al in U.S. Pat. No. 3,256,226 decribe vinyl esters where the molecular weight of the polyepoxide is increased by reacting a dicarboxylic acid with the polyepoxide resin as well as acrylic acid, etc. Other functional compounds containing a group which is reactive with an epoxide group, such as an amine, mercaptan and the like, may be utilized in place of the dicarboxylic acid. All of the above-described compositions, which contain the characteristic linkages

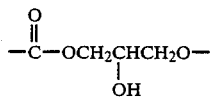

and terminal polymerizable vinylidene groups are classified as vinyl esters.

The vinyl ester is typically combined with a reactive, dilutent: a copolymerizable vinyl monomer, to alter the viscosity of the mixture, to vary the properties of the cured coating, or for other known reasons. Most any vinyl monomer may be employed which is copolymerizable with the unsaturated groups of the vinyl ester. Such monomers include both monovinyl and polyvinyl monomers. Typical monomers include the alkenyl aromatic monomers such as styrene, vinyltoluene, t-butylstyrene and the like; and alkyl and hydroxyalkyl esters of acrylic and methacrylic acid such as methyl, ethyl, propyl, butyl, cyclohexyl and hydroxyethyl, hydroxypropyl and hydroxybutyl acrylates and methacrylates. In addition to the above, other monomers are especially useful for ultraviolet light curable systems such as 2-acetoxyalkyl acrylates; pentaerythritol di-, tri- or tetra-acrylate and the like may be added in any order.

The vinyl ester and copolymerizable vinyl monomer blend is a crosslinkable vinyl ester resin which is cured by mixing in a free radical forming catalyst in an amount ranging from 0.1 to about 5 percent by weight, preferably 1 to 2 percent by weight. Examples of these catalysts are benzoyl peroxide, tertiary butyl hydroperoxide, methylethylketone peroxide and the like. It is frequently of value to add an accelerator such as N,N-dimethylaniline, cobalt naphthenate and the like.

Preparation of epoxidized substituted hydroxystyrylaza compounds is taught by Ser. No. 07/317,267 filed on the same date as the instant case. The process of this invention uses a substituted hydroxystyrylaza compound described by U.S. Pat. No. 4,600,767 which is incorporated herein by reference. Expoxidation of the hydroxystyrylaza compound is completed in a conventional manner by reaction with an epihalohydrin with subsequent dehydrohalogenation with a basic-acting material and finally recovering the resultant styrylaza functional glycidyl ether product.

The vinyl ester compositions of the present invention contain styrylaza groups and are derived by reaction of epoxidized hydroxystyrylaza compounds with a monoolefinically unsaturated monocarboxylic acid. The invention consists of the vinyl esters and the vinyl ester plus solvent and/or copolymerizable vinyl monomer formulations, whether or not cured.

SUMMARY OF THE INVENTION

The present invention pertains to vinyl ester compositions containing styrylaza groups. Said compositions are prepared by reacting (a) a polyepoxide of a substituted hydroxystyrylaza compound with (b) from about 0.75 to about 1, preferably from about 0.9 to about 1, mole of a monounsaturated monocarboxylic acid or mixture of monounsaturated monocarboxylic acids per mole of epoxide. The process of making the compositions is carried out in the presence of from zero to about 2, preferably 0.01 to about 0.5 percent by weight of a suitable esterification catalyst and, optionally, one or more organic solvents inert to the other reactants.

Another aspect of the present invention pertains to the product resulting from curing the aforementioned vinyl esters containing styrylaza groups.

Another aspect of the present invention pertains to a polymerizable mixture of (A) at least one of the aforementioned vinyl ester compositions containing styrylaza groups and
(B) at least one material selected from
 (1) copolymerizable ethylenically unsaturated monomers;
 (2) vinyl ester compositions resulting from reacting (a) an epoxy resin represented by formulas VIII, IX, X, or XI a mixture of such epoxy resins and (b) at least one monounsaturated monocarboxylic acid;
 (3) styryl pyridines and/or prepolymers or polymers thereof;
 (4) vinyl styryl pyridines and/or prepolymers or polymers thereof;
 (5) alkenylphenyl cyanates;
 (6) dicyanates and/or polycyanates;
 (7) bismaleimides and/or polymaleimides;
 (8) eposy resins;
 (9) alkenylphenol capped styryl pyridines and/or prepolymers or polymers thereof;
 (10) allyl styryl pyridines and/or prepolymers or polymers thereof;
 (11) styryl pyridine cyanates and/or prepolymers or polymers thereof;
 (12) furan capped styryl pyridines and/or prepolymers or polymers thereof;
 (13) alkenylphenyl glycidyl ether capped hydroxystyryl pyridines and/or prepolymers or polymers thereof;

(14) mixtures thereof in any proportion and combination.

Another aspect of the present invention pertains to polymers and/or cured products of the aforementioned polymerizable and/or curable mixtures.

DETAILED DESCRIPTION OF THE INVENTION

Suitable epoxidized substituted hydroxystyrylaza compounds which can be employed to prepare the vinyl esters include, for example, those represented by the formulas:

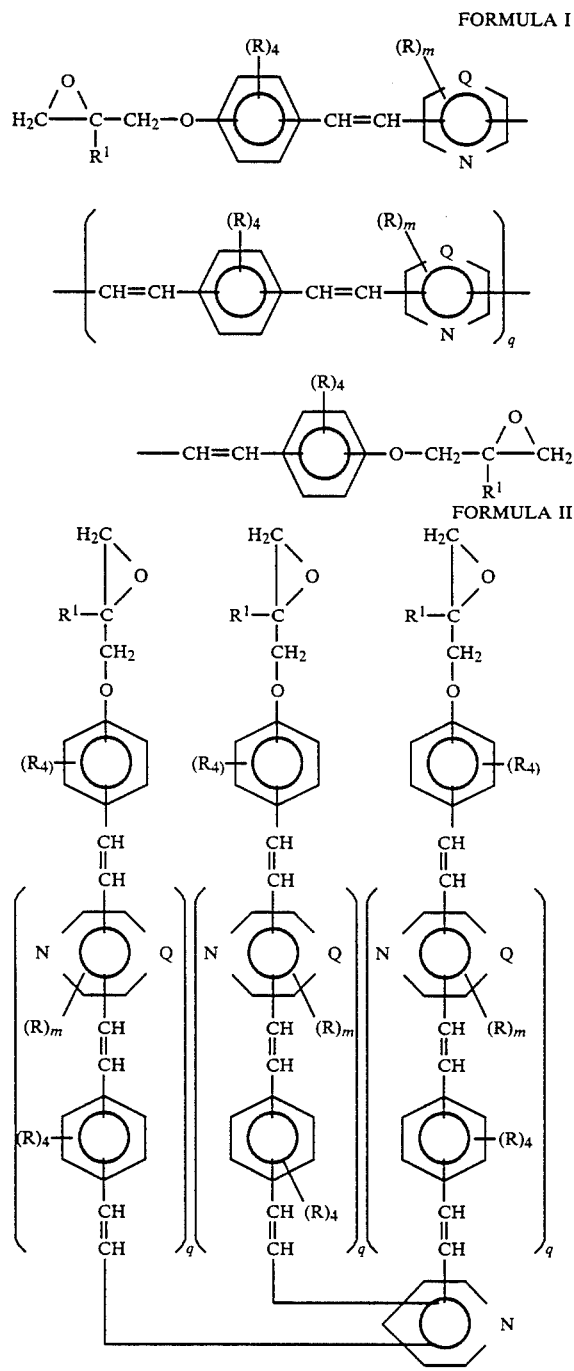

wherein each Q is independently C-R or N and when Q is C-R, m is 3, when Q is N, m is 2; each R is independently hydrogen, a halogen, preferably chlorine or bromine, a hydrocarbyl or hydrocarbyloxy group having from 1 to about 20, preferably from 1 to about 4 carbon atoms, nitro, nitroso, nitrile, $$-\overset{\overset{O}{\|}}{C}-E,$$

allyl or a methallyl group; E is a hydrocarbyl group having from 1 to about 20 carbon atoms with the proviso that the R groups ortho or para to the glycidyl ether linkage may not be hydrogen; each q has a value from 0 to about 50; and each $R^1$ is independently hydrogen or a hydrocarbyl group having from 1 to about 4 carbon atoms.

It is to be understood that in addition to the structures represented by Formulas I and II that minor amounts of other structures may be present. Typical of the minor structures present is that resulting from the addition of a methyl group of a methylated azine compound to the styryl double bond. This type of addition product is described by Clavreul and Bloch in *Makromol. Chem.*, 188, pp. 47–65 (1987).

Particularly suitable epoxidized substituted hydroxystyrylaza compounds include, for example, the diglycidyl ethers of 2,6-(3,5-dimethyl-4-hydroxystyryl) pyridine; 2,4-(3,5-dimethyl-4-hydroxystyryl) pyridine; 2,6-(3,5-dimethyl-2-hydroxystyryl) pyridine; 2,6-(2,3,5,6-tetramethyl-4-hydroxystyryl) pyridine; 2,6-(3,5-dibromo-4-hydroxystyryl) pyridine; 2,6-(3,5-dimethoxy-4-hydroxystyryl) pyridine; 2,6-(3,5-dimethyl-2,6-dibromo-4-hydroxystyryl) pyridine; 2,6-(3,5-diethyl-4-hydroxylstyryl) pyridine; 2,6-(3,5-diallyl-4-hydroxylstyryl) pyridine; 2,6-(3-methyl-5-tert-butyl-4-hydroxystyryl) pyridine; 2,6-(3-methyl-5-nitro-4-hydroxystyryl) pyridine; 2,6-(3-methyl-5-cyano-4-hydroxystyryl) pyridine; 2,6-(3,5-dimethyl-4-hydroxystyryl) pyrazine and the triglycidyl ethers of 2,4,6-(3,5-dimethyl-4-hydroxystyryl) pyridine; 2,4,6-(3,5-dimethyl-2-hydroxystyryl) pyridine, mixtures thereof and the like.

Suitable olefinically unsaturated monocarboxylic acids for reaction with the epoxidized substituted hydroxystyrylaza compounds include, for example, acrylic acid, methacrylic acid, cyanoacrylic acid, crotonic acid, α-phenylacrylic acid, methoxyacrylic acid, monomethyl ester of maleic acid, monomethyl ester of fumaric acid, mixtures thereof and the like. Methacrylic acid is a most preferred monounsaturated monocarboxylic acid.

Suitable esterification catalysts which are optionally used in the reaction of one or more epoxidized substituted hydroxystyrylaza compounds and one or more monounsaturated monocarboxylic acids are well known in the prior art. Chromium trichloride, tris(dimethylaminoethyl)phenol and ethyltriphenyl phosphonium acetate.acetic acid complex are most preferred as the catalysts. A quantity of from about 0.01 to about 2 percent by weight has been found to be a suitable quantity of catalyst with concentrations of 0.1 to about 0.3 weight percent of the total reactants used being most preferred.

A suitable process inhibitor is typically used in the reaction between the epoxidized substituted hydroxystyrylaza compound and a monounsaturated monocarboxylic acid to prevent gelation (homopolymerization of the vinyl ester and/or copolymerization of the vinyl ester with unreacted monounsaturated monocarboxylic acid). Hydroquinone activated with air is a most preferred inhibitor at concentrations of from about 100 ppm to about 500 ppm based on the weight of the total reactants used.

The reaction to produce the vinyl ester is usually conducted at a temperature of from about 50° C. to about 125° C., preferably from about 80° C. to about 120° C. for from about 30 minutes to about 720 minutes, preferably from about 90 to about 240 minutes. Although reaction times and reaction temperatures can vary substantially, most preferred vinyl ester compositions are obtained by reacting to a specific conversion, typically 1.5 to 0.25 percent epoxide.

The reaction to produce the vinyl ester is optionally conducted in one or more organic solvents inert to the other reactants. The term inert as applied to the organic solvent means that little, if any reaction between the epoxidized substituted hydroxystyrylaza compound, the monounsaturated monocarboxylic acid or the vinyl ester thereof occurs under the reaction conditions employed. Typical of the inert organic solvents are the aliphatic ketones, such as methylisobutyl ketone, the chlorinated aliphatics, such as perchloroethylene, the aromatic hydrocarbons, such as toluene and the vinyl aromatic monomers, such as styrene.

According to the present invention, the curing of the vinyl ester compositions is effected by the application of heat and/or pressure, optionally in the presence of a free radical forming catalyst. Catalysts that may be used for the curing (polymerization) are preferably the peroxide catalysts, such as benzoyl peroxide, lauroyl peroxide, t-butyl hydroperoxide, t-butylperbenzoate, methylethylketone peroxide, potassium persulfate and the like. The amount of the catalyst added will preferably vary from 0.1 to about 2 percent by weight. Temperatures employed may vary over a considerable range but usually are in the range of 5° C. to 250° C.

Additionally, more rapid curing of the thermosetting vinyl ester compositions may be accomplished by the addition of accelerating agents such as lead, vanadium or cobalt naphthenate, N,N-dimethylaniline and the like, usually in concentrations ranging from about 0.01 to about 2 percent by weight.

Styryl pyridine prepolymers and/or polystyryl pyridines which can be employed to prepare the polymerizable mixtures of the present invention include those described by Ropars et al in U.S. Pat. Nos. 3,994,862 and 4,525,573; Melassine et al in U.S. Pat. No. 4,163,740 and Chevallier in U.S. Pat. No. 4,540,770 which are incorporated herein by reference.

Suitable vinyl esters which can be employed herein include those described by Bearden in U.S. Pat. No. 3,367,992, Bowen in U.S. Pat. Nos. 3,006,112 and 3,179,623, Fekete in U.S. Pat. Nos. 3,301,743 and 3,256,226 which are incorporated herein by reference.

Suitable vinyl styryl pyridines and/or vinyl polystyryl pyridines which can be employed herein include those described by Ratto el al in U.S. Pat. No. 4,362,860; by Peake in U.S. Pat. No. 4,471,107; and by Ming-ta et al in Technology Vectors, Vol. 29, pages 1034–1042 (1984) published by the Society for the Advancement of Material and Process Engineering which are incorporated herein by reference. A specific preparation of a vinyl polystyryl pyridine is taught by Hefner, Jr. in U.S. Pat. No. 4,578,439 which is additionally incorporated herein by reference.

Suitable alkenylphenyl cyanates which can be employed herein include, for example, those represented by the formula

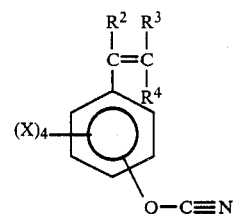

FORMULA III wherein each $R^2$, $R^3$ and $R^4$ is independently hydrogen or a hydrocarbyl group having from 1 to about 3 carbon atoms and each X is independently hydrogen, a hydrocarbyl or hydrocarbyloxy group having from 1 to about 4 carbon atoms, chlorine or bromine or a phenyl group.

Particularly suitable alkenylphenyl cyanates include, for example, p-isopropenylphenyl cyanate, p-vinylphenyl cyanate, m-vinylphenyl cyanate, methyl-p-isopropenylphenyl cyanate, 3-chloro-4-isopropenylphenyl cyanate, o-allylphenyl cyanate, p-allylphenyl cyanate mixtures thereof and the like. It is most preferred that the alkenylphenyl cyanate be substantially free of dimeric and/or oligomeric components although it is operable to use an alkenylphenyl cyanate containing substantial (up to 90 percent by weight) dimeric and/or oligomeric components. Said components are formed during the cyanation reaction of an alkenylphenol containing the corresponding dimeric diphenols and/or oligomeric polyphenols. A specific preparation of p-isopropenylphenyl cyanate is taught by Hefner, Jr. in U.S Pat. No. 4,578,439 which is incorporated herein by reference.

Suitable aromatic dicyanates (polycyanates) which can be employed herein include, for example, those represented by the formulas

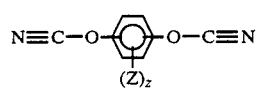

FORMULA IV

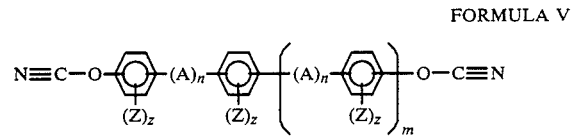

FORMULA V

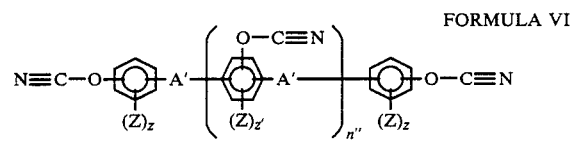

FORMULA VI

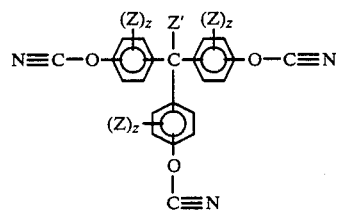

FORMULA VII wherein each A is independently an alkylene group having from 1 to about 10 carbon atoms, preferably from 1 to about 4 carbon atoms, —O—,

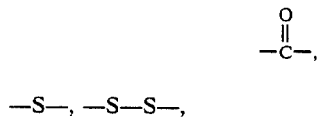

—SO₂—; each A' is independently an alkylene group having from 1 to about 6, preferably from 1 to about 4 carbon atoms or a

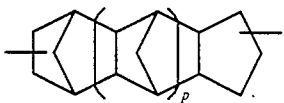

group; each Z is independently hydrogen, a hydrocarbyl or hydrocarbyloxy group having from 1 to about 10, preferably 1 to about 4 carbon atoms, a halogen, preferably chlorine or bromide, a phenyl group, or a —O—C≡N group; Z' is independently hydrogen, a hydrocarbyl or hydrocarbyloxy group having from 1 to about 10, preferably 1 to about 4 carbon atoms, a halogen, preferably chlorine or bromine, or a phenyl group; p has a value of from zero to about 10, preferably from zero to 3; n has a value of zero or 1; m has a value from zero to about 100, preferably from zero to about 30; n'' has a value of from about 0.001 to about 6, preferably from about 0.01 to about 3; z has a value of 4, and z' has a value of 3.

Particularly suitable aromatic dicyanates (polycyanates) which can be employed herein include bisphenol A dicyanate; the dicyanates of 4,4'-dihydroxydiphenyl oxide, resorcinol, 4,4'-thiodiphenol, 4,4'-sulfonyldiphenol, 3,3'5,5'-tetrabromobisphenol A, 2,2'6,6'-tetrabromobisphenol A, 3-phenylbisphenol A, 4,4'-dihydroxybiphenyl, 2,2'-dihydroxybiphenyl, 2,2',4,4'-tetrahydroxydiphenyl methane, 2,2',6,6'-tetramethyl-3,3',5,5'-tetrabromobisphenol A, 3,3'-dimethoxybisphenol A;

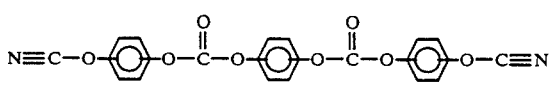

the tricyanate of tris(hydroxyphenyl)methane, the polycyanate of a phenolformaldehyde condensation product (novolac), the polycyanate of a dicyclopentadiene and phenol condensation product and the like. The aromatic polycyanates may be used either alone or in any combination. A specific preparation of bisphenol A dicyanate is taught by Hefner, Jr., in U.S. Pat. No. 4,578,439 which is incorporated herein by reference.

Suitable epoxy resins include materials having an average of more than one vicinal epoxide group per molecule such as, for example, the glycidyl ethers represented by the formulas

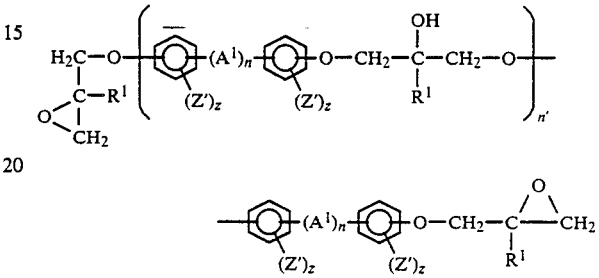

FORMULA VIII

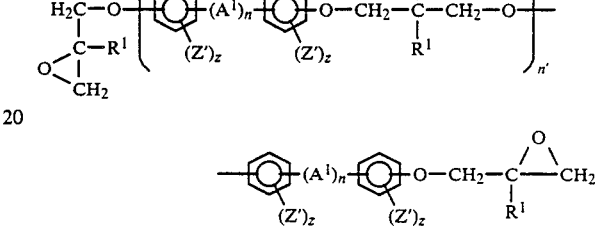

FORMULA IX

FORMULA X

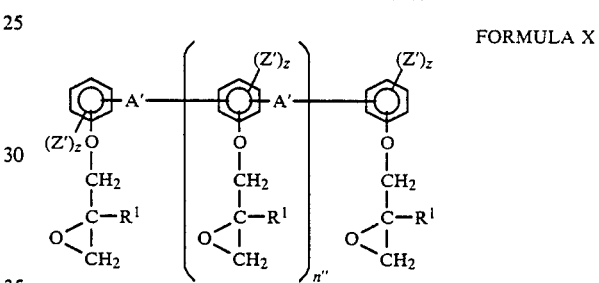

FORMULA XI

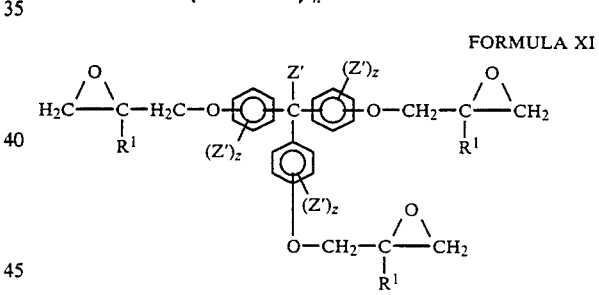

wherein A¹ is independently an alkylene group having from 1 to about 10 carbon atoms, preferably from 1 to about 4 carbon atoms, —O—, $$-\overset{O}{\underset{\|}{C}}-,$$

—S—, —S—S—,

—SO₂—, A', Z', R¹, n, n'', z, z'' and p are as hereinbefore defined and n' has a value of from about zero to about 30, preferably from about zero to about 5.

Particularly suitable polyepoxides which can be employed herein include, for example, the diglycidyl ethers of resorcinol, bisphenol A, 4,4'-dihydroxy-biphenyl, 4,4'-dihydroxydiphenyl methane, 3,3',5,5'-tetrabromobisphenol A, the triglycidyl ether of tris(hydroxyphenyl)methane, the polyglycidyl ether of a phenol-formaldehyde condensation product (novolac), the polyglycidyl ether of dicyclopentadiene and phenol condensation product and the like. The polyepoxides can be used either alone or in combination.

The aforementioned epoxy resins can be prepared by reaction of a diphenol or polyphenol with an epihalohydrin and a basic acting material. Said reaction generally involves two distinct steps: coupling reaction of the epihalohydrin and diphenol or polyphenol to provide a halohydrin intermediate and dehydrohalogenation reaction of the halohydrin intermediate to provide the glycidyl ether product. Suitable catalysts and reaction conditions for preparing polyepoxides are described in the *Handbook of Epoxy Resins* by Lee and Neville, McGraw-Hill (1967) which is incorporated herein by reference.

Particularly preferred epoxy resins include, for example, styryl pyridine epoxy resins described by Yan et al in "Styryl-Pyridine Based Epoxy Resins: Synthesis and Characterization" in *Organic Coatings and Applied Polymer Science Proceedings*, Vol. 46, pp. 482–488 (1982) published by American Chemical Society which is incorporated herein by reference.

Suitable alkenylphenol capped styryl pyridines and/or alkenylphenol capped polystyryl pyridines which can be employed herein include those prepared by reacting a di- or polymethyl pyridine compound with an aromatic di- or polyaldehyde. The resultant product is then reacted with an alkenylphenol represented by the formula III. Preparation of said alkenylphenol capped styryl pyridines is taught by LaTulip in U.S. Pat. No. 4,500,690 which is incorporated herein by reference.

Suitable bismaleimides (polymaleimides) which can be employed herein include, for example, those represented by the formulas

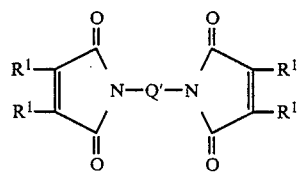

FORMULA XII

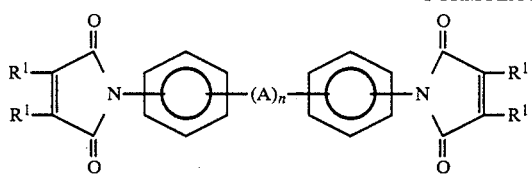

FORMULA XIII

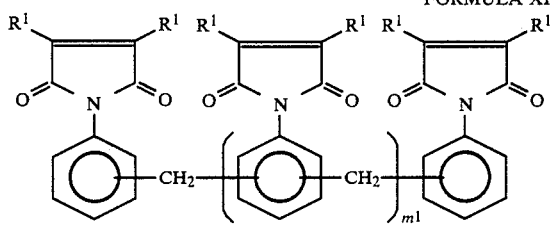

FORMULA XIV wherein $R^1$, n and A are as hereinbefore defined; $Q'$ is an alkylene group having from 2 to about 12 carbon atoms and $m^1$ has a value of 0.01 to about 10.

Particularly suitable bismaleimides (polymaleimides) which can be employed herein include, for example, N,N'-ethylenebismaleimide, N,N'-ethylenebis(2-methylmaleimide), N,N'-hexamethylenebismaleimide, N,N'-(oxydi-p-phenylene)bismaleimide, N,N'-(methylenedi-p-phenylene)bismaleimide, N,N'-(thiodi-p-phenylene)bismaleimide, N,N'-(sulfonyldi-m-phenylene)bismaleimide, N,N'-(isopropylidenedi-p-phenylene)bismaleimide, polymethylene polyphenylene polymaleimides and the like. The bismaleimides (polymaleimides) may be used either alone or in any combination.

The bismaleimides (polymaleimides) can be prepared by reacting a stoichiometric quantity of a maleic anhydride per amine group with a diamine (polyamine) in the presence of a suitable solvent.

Preparation of bismaleimides (polymaleimides) is disclosed by Arnold et al in U.S. Pat. No. 2,462,835 and by Searle in U.S. Pat. No. 2,444,536 which are incorporated herein by reference. A specific preparation of N,N'-(methylenedi-p-phenylene)bismaleimide is taught by Hefner, Jr. in U.S. Pat. No. 4,578,439 which is incorporated herein by reference.

Suitable styryl pyridine cyanates and/or polystyryl pyridine cyanates which can be employed herein include those prepared by reacting a hydroxy styryl pyridine and/or hydroxy polystyryl pyridine with a cyanogen halide in the presence of a base or basic-acting substance. Preparation of said styryl pyridine cyanates is taught by Hefner, Jr. in U.S. Pat. No. 4,578,439 which is incorporated herein by reference.

Suitable allyl styryl pyridines and/or allyl polystyryl pyridines which can be employed herein include those prepared by reacting an allylating agent such as an allyl halide or allyl methyl carbonate with a hydroxystyryl pyridine and/or a hydroxy polystyryl pyridine. Preparation of said allyl styryl pyridines is taught by Hefner, Jr. in U.S. Pat. No. 4,540,745 which is incorporated herein by reference.

Suitable alkenylphenyl glycidyl ether capped hydroxystyryl pyridines and/or alkenylphenyl glycidyl ether capped hydroxypolystyryl pyridines which can be employed herein include those prepared by reacting a alkenylphenyl glycidyl ether with a hydroxystyryl pyridine and/or a hydroxypolystyryl pyridine. Preparation of said alkenylphenyl glycidyl ether capped hydroxystyryl pyridines is taught by Hefner, Jr. in U.S. Pat. No. 4,539,377 which is incorporated herein by reference.

Suitable furan capped styryl pyridines and/or furan capped polystyryl pyridines which can be employed herein are described in Ser. No. 848,100 filed Apr. 4, 1986, now U.S. Pat. No. 4,736,035 which is incorporated herein by reference.

Suitable copolymerizable ethylenically unsaturated monomers include the vinyl aromatic compounds such as styrene, α-methylstyrenes, vinyltoluenes, halogenated styrenes, t-butylstyrenes, divinylbenzenes, and the like. Other suitable monomers include the methyl, ethyl, isopropyl, octyl, etc., esters of acrylic or methacrylic acid, vinyl acetate, diallyl maleate, dimethallyl fumarate, acidic monomers such as acrylic acid, methacrylic acid, crotonic acid and amide monomers such as acrylamide, N-alkyl acrylamides and the like and mixtures thereof. Allyl monomers such as diallylphthalate, triallylisocyanurate, and the like may also be used.

Preferred copolymerizable monomers are styrene, vinyltoluene, ortho-, meta- and para-halostyrenes, vinylnaphthalenes, the various α-substituted styrenes as well as the various di-, tri- and tetra-halostyrenes, and acrylic, methacrylic and crotonic acid esters which include both the saturated alcohol esters and the hydroxylalkyl esters.

If an inert solvent, other than one containing polymerizable ethylenic unsaturation is used to prepare the vinyl ester product, it is preferably removed, for example, via distillation under vacuum, prior to addition of one or more of the aforesaid polymerizable materials. For certain end uses, such as coating or impregnating a fibrous reinforcement, the presence of an inert solvent is desirable as a vehicle for the polymerizable mixture.

Curing of the polymerizable mixtures varies as a function of the amount and type of each component present to comprise said mixture. Generally, the application of heat and/or pressure optionally in the presence of one or more catalysts suitable for curing the curable functional moieties provided by the components of the mixture and defined in the incorporated cited prior art produce a cured product. As a specific example, (A) vinyl esters containing styrylaza groups and one or more of (B-1) copolymerizable ethylenically unsaturated monomers and/or (B-2) vinyl ester compositions resulting from reacting one or more epoxy resins of formulas VIII, IX, X, XI and one or more monounsaturated monocarboxylic acids are cured using the previously described method for the vinyl ester containing styrylaza groups.

The vinyl esters containing styrylaza groups and polymerizable mixtures thereof are useful to make laminates, castings, coatings, and the like. The laminates are made by mixing into the vinyl ester or polymerizable mixture containing the vinyl ester a known amount of one or more catalysts and/or accelerators and adding this mixture to a suitable fibrous reinforcement such as asbestos fibers, carbon fibers, fibrous glass or inorganic fibers. The vinyl ester or polymerizable mixture can be rolled, sprayed or impregnated into the fibrous reinforcement, such as fibrous glass. When fibrous glass is used, it can be in any form such as chopped strands, filaments, glass ribbons, glass yarns or reinforcing mats.

The vinyl ester or polymerizable mixture may be compounded with solvents, pigments, low profile additives, fillers, flow modifiers or other resinous products and cured to form useful coatings in a manner well known in the art.

The following examples are illustrative of the invention, but are not to be construed as to limiting the scope thereof in any manner.

EXAMPLE 1

A. Synthesis of
2,6-(3,5-dimethyl-4-hydroxystyryl)pyridine 107 g of 2,6-lutidine (1 mole), 375 g of 3,5-dimethyl-4-hydroxybenzaldehyde (2.5 moles), 510 g of acetic anhydride (5 moles) and 300.2 g of acetic acid (5 moles) were placed in a 2-liter round bottom flask equipped with a magnetic stirrer, nitrogen pad, thermometer and reflux condenser. The flask was heated to 140° C. for five days. The flask was then cooled to room temperature and equipped with a simple distillation head. The solution was distilled to remove the acetic acid and acetic anhydride. The remaining material after cooling to room temperature was a light brown solid. The solid was then washed with 1000 ml of methanol and filtered resulting in a white solid that was analyzed by nuclear magnetic resonance spectroscopy (NMR) and demonstrated to be 2,6-di(3,5-dimethyl-4-acetoxystyryl)pyridine. The white solid, 200 ml of methanol, 1000 ml of water and 88.0 g of NaOH (2.2 moles) were placed in a 2-liter round bottom flask equipped the same as above and heated to 70° C. with stirring for 24 hours. The flask was then cooled to room temperature and equipped with a distillation head. The flask was heated to distill off the methanol and leave the water soluble sodium salt. The aqueous solution was then acidified with HCl causing a pale yellow solid to drop out. The solid was filtered and dried under vacuum at 110° C. for 2 hours. The material was analyzed by NMR and differential scanning calorimetry (DSC). The NMR analysis confirmed the product structure. The DSC showed a distinct melting point at 207° C. (endotherm) with no exotherms noted.

B. Synthesis of Epoxy Resin of
2,6-(3,5-dimethyl-4-hydroxystyryl)pyridine

A portion (185.73 grams, 1.0 hydroxyl equivalent) of the substituted hydroxystyrylpyridine from A above, epichlorohydrin (5.0 moles, 462.65 grams), isopropanol (35% by weight of epichlorohydrin used, 249.12 grams) and water (8% by weight of epichlorohydrin used, 40.23 grams) were added to a reactor and stirred under a nitrogen atmosphere at 50° C. until a fine suspension was formed. At this time, dropwise addition of sodium hydroxide (1.8 moles, 72.0 grams) solution in water (288.0 grams) commenced and was completed over the next 45 minutes and at a rate so as to maintain the reaction temperature between 50° and 52° C. Fifteen minutes after the addition of sodium hydroxide solution, a second solution of sodium hydroxide (0.8 mole, 32.0 grams) in water (128.0 grams) was added dropwise to the reactor over the next 20 minutes so as to maintain the reaction temperature at 50° C. After fifteen minutes of post reaction between 50° and 53° C., the reactor was cooled over a 14 minute period to 40° C. then an initial water wash (750 grams) was added to the reactor and the contents were transferred to a separatory funnel. The water wash layer was separated and discarded while the organic layer was added back into the separatory funnel with a second water wash (750 grams) and epichlorohydrin (250 grams). The water wash layer was separated and discarded while the organic layer was added back into the separatory funnel with a final water wash (500 grams). The recovered organic layer was stripped of solvents by rotary evaporation at 80° C. for 120 minutes under vacuum. The epoxy resin was recovered (234.9 grams) as a light gray colored solid. Epoxide titration (with correction for response provided by the substituted hydroxystyrylpyridine starting reactant) revealed the presence of 16.99% epoxide. Nuclear magnetic resonance spectroscopic analysis of a portion of the epoxy resin demonstrated complete conversion of the phenolic hydroxyl groups to glycidyl ether groups. Differential scanning calorimetry revealed a distinct melting point endotherm at 158° C. followed by an exotherm at 315° C.

C. Methacrylation of the Epoxy Resin of
2,6-(3,5-dimethyl-4-hydroxystyryl)pyridine A portion (50.0 grams) of the epoxy resin of 2,6-(3,5-dimethyl-4-hydroxystyryl)pyridine from B above and methylisobutyl ketone (100 grams) were added to a reactor and heated to 90° C. Hydroquinone (0.0266 gram) then methacrylic acid (16.48 grams) were sequentially added then stirring and sparging with air (0.5 liter per minute) were started. After three minutes at the 90° C. reaction temperature, 33.33 percent aqueous chromium trichloride catalyst (0.0625 gram) was added and the temperature controller was set at 110° C. and this temperature was achieved two minutes later. After two minutes at the 110° C. reaction temperature, the temperature controller was set at 115° C. and this temperature was achieved two minutes later. After 121 minutes at the 115° C. reaction temperature, titration of a sample of the vinyl ester demonstrated the presence of 0.67 percent epoxide (with correction for response provided by the substituted hydroxystyrylpyridine starting reactant and solvent dilution). Infrared spectrophotometric analysis of a solvent free film sample of the vinyl ester demonstrated the presence of the expected carboxylic acid ester functionality (1721 cm$^{-1}$). The vinyl ester was recovered in essentially quantitative yield as a transparent amber solution in methylisobutylketone.

EXAMPLE 2

A. Differential Scanning Calorimetry of Methacrylation Product of Epoxy Resin of 2,6-(3,5-dimethyl-4-hydroxystyryl)pyridine Differential scanning calorimetry (DSC) of a portion of the solvent free vinyl ester of Example 1C (12.3 milligrams) was completed using a rate of heat increase of 10° C. per minute from 30° C. to 350° C. under nitrogen gas flowing at a rate of 35 cc per minute. The vinyl ester sample was prepared by allowing a solution cast film on mylar to devolatilize at 25° C. for 48 hours. A minor exotherm at 94° C. was followed by two larger exotherms of 168° C. and 290° C., respectively.

B. Thermal Mechanical Analysis (Expansion Mode) of Cured Methacrylation Product of Epoxy Resin of 2,6-(3,5-dimethyl-4-hydroxystyryl)pyridine Thermal mechanical analysis (TMA) of a portion of the vinyl ester of Example 1C devolatilized and cured at 177° C. for 1.5 hours was completed using a rate of heat increase of 10° C. per minute from 50° C. to 300° C. A midpoint glass transition temperature (Tg) of 165.5° C. was observed. An additional post cure for 2 hours at 220° C. produced an increase in Tg to 170.6° C.

C. Thermogravimetric Analysis (TGA) of Cured Methacrylation Product of Epoxy Resin of 2,6-(3,5-dimethyl-4-hydroxystyryl)pyridine Thermogravimetric analysis (TGA) of a portion of the vinyl ester of Example 1C devolatilized and cured at 177° C. for 1.5 hours was completed using a rate of heat increase of 10° C. per minute from 50° C. to 800° C. under nitrogen flowing at a rate of 35 cc per minute. A 5 percent weight loss was observed at a temperature of 300° C. The weight percent of material remaining at the 800° C. temperature was 26.5 percent.

A second portion of cured vinyl ester of Example 1C was analyzed by TGA utilizing the aforementioned conditions except for a change to an air atmosphere instead of nitrogen. A 5 percent weight loss was observed at a temperature of 311° C. The weight percent material remaining at the 800° C. temperature was 3.2 percent.

EXAMPLE 3

A. Methacrylation of Epoxy Resin of 2,6-(3,5-dimethyl-4-hydroxystyryl)pyridine in Styrene A portion (44.5 grams) of the epoxy resin of 2,6-(3,5-dimethyl-4-hydroxystyryl)pyridine from Example 1B and styrene (39.45 grams) containing 50 ppm t-butylcatechol were added to a reactor and heated to 90° C. Hydroquinone (0.0237 gram) then methacrylic acid (14.67 grams) were sequentially added then stirring and sparging with air (0.5 liter per minute) were started. After three minutes at the 90° C. reaction temperature, 33.33 percent aqueous chromium trichloride catalyst (0.0556 gram) was added the temperature controller was set at 110° C. and this temperature was achieved two minutes later. After two minutes at the 110° C. reaction temperature, the temperature controller was set at 115° C. and this temperature was achieved one minute later. After 120 minutes at the 115° C. reaction temperature, titration of a sample of the vinyl ester demonstrated the presence of 1.08 percent epoxide (with correction for response provided by the substituted hydroxystyrylpyridine starting reactant and dilution by styrene). The vinyl ester solution in styrene was recovered (97.4 grams) as a transparent amber liquid.

B. Mechanical Properties of Cured Methacrylation Product of Epoxy Resin of 2,6-(3,5-dimethyl-4-hydroxystyryl)pyridine The styrenated vinyl ester resin from A above was used to prepare a clear, unfilled, ⅛ inch casting using a cure system of 2.0 percent by weight methylethylketone peroxide and 0.2 percent by weight cobalt naphthenate (6.0 percent) at room temperature (25° C.). Post curing was completed twelve hours after the room temperature cure exotherm subsided using a temperature of 100° C. for 2 hours then 150° C. for 2 hours. Mechanical properties of tensile (4) and flexural (2) test pieces were determined using an Instron machine with standard test methods (ASTM D-638 and ASTM D-790). Differential scanning calorimetry (DSC) of a 12 milligram portion of the clear, unfilled casting was completed using the method of Example 2A. The average Barcol hardness value is on the 934-1 scale. The results are given in Table I.

TABLE I

| | |
|---|---|
| Average Barcol Hardness | 43 |
| Tensile Strength, psi | 12,126 |
| Elongation, % | 6.05 |
| Flexural Strength, psi | 20,798 |
| Flexural Modulus, psi | 480,000 |
| Midpoint Glass Transition Temperature, °C. | 152.7 |

COMPARATIVE EXPERIMENT 1

Attempted Methacrylation of a Diglycidyl Ether of Bisphenol A in Styrene

A portion (44.5 grams) of a diglycidyl ether of bisphenol A having an epoxide equivalent weight (EEW) of 181.8 and styrene (43.28 grams) containing 50 ppm t-butylcatechol were added to a reactor and heated to 90° C. Hydroquinone (0.0260 gram) then methacrylic acid (20.42 grams) were sequentially added then stirring and sparging with air (0.5 liter per minute) were started. After three minutes at the 90° C. reaction temperature, 33.33 percent aqueous chromium trichloride catalyst (0.0556 gram) was added and the temperature controller was set at 110° C. and this temperature was achieved three minutes later. After two minutes at 110° C. reaction temperature, the temperature controller was set at 115° C. and this temperature was achieved one minute later. After 137 minutes at the 115° C. reaction temperature, titration of a sample of the reaction product demonstrated the presence of 6.17 percent epoxide (with correction for dilution by styrene). After 289 minutes at the 115° C. reaction temperature, titration of a sample of the reaction product demonstrated the presence of 3.02 percent epoxide. After an additional 30 minutes of reaction, the reaction product gelled to a rigid mass and was discarded.

We claim:

1. A polymerizable mixture comprising
(I) the vinyl ester resin composition prepared by reacting
   (A) a polyepoxide of a thermostable hydroxystyrylaza compound wherein said hydroxystyrylaza compound is prepared by reacting
      (1) one or more mono hydroxy aromatic aldehydes wherein the ortho and para positions from the hydroxy group having no aldehyde groups are substituted by groups inert to condensation with alkyl azines, and
      (2) one or more methylated azine compounds having the formula

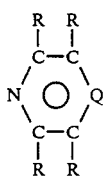

where Q is N or C-R, and each R is independently hydrogen, a halogen, a hydrocarbyl or hydrocarbyloxy group having from 1 to 20 carbon atoms, nitro, nitroso, nitrile,

allyl or a methallyl group; E is a hydrocarbyl group having from 1 to about 20 carbon atoms with the proviso that the total number of methyl groups (R=—CH₃) substituted on the ring is in the range from 2-4 and wherein said polyepoxy compound has one of the following formulas

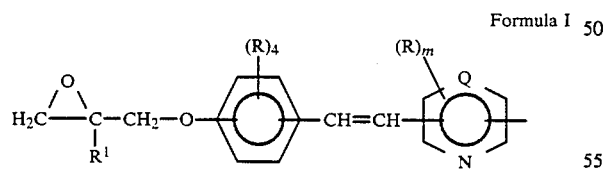

Formula I

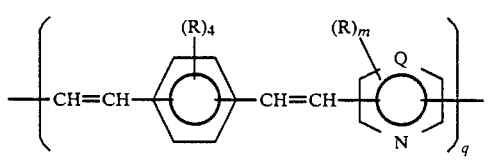

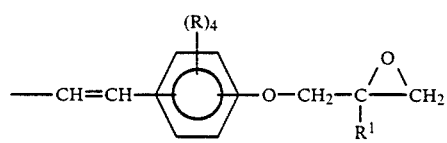

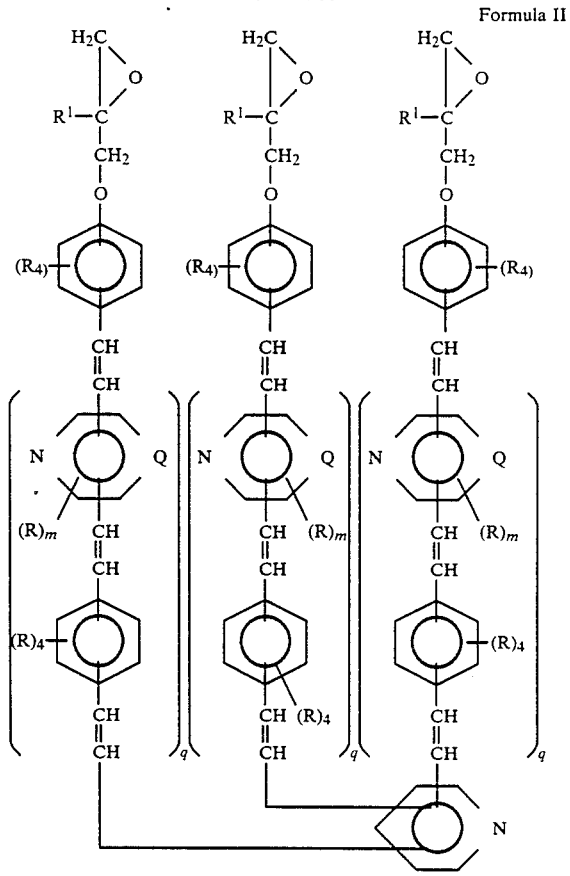

Formula II wherein Q is independently C-R or N and when Q is C-R, m is 3, when Q is N, m is 2; each R is independently hydrogen, a halogen, a hydrocarbyl or hydrocarbyloxy group having from 1 to about 20 carbon atoms, nitro, nitroso, nitrile,

allyl or a methallyl group; E is a hydrocarbyl group having from 1 to about 20 carbon atoms with the proviso that the R groups ortho or para to the glycidyl ether linkage may not be hydrogen; q has a value from 0 to about 50; and R¹ is independently hydrogen or a hydrocarbyl group having from 1 to about 4 carbon atoms with (B) about 0.75 to about 1.0 mole of one or more mono-olefinically unsaturated monocarboxylic acids per mole of epoxide; and (II) one or more members of the group consisting of
   (A) ethylenically unsaturated monomers,
   (B) vinyl ester compositions derived from (1) one or more epoxy resins represented by the following formulas VIII, IX, X or XI

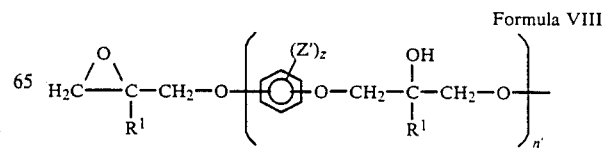

Formula VIII

-continued

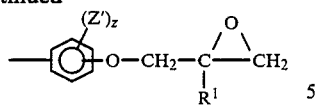
Formula IX

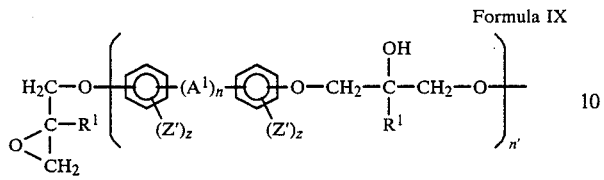

Formula X

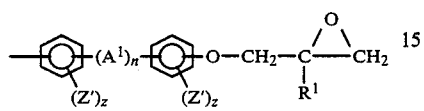

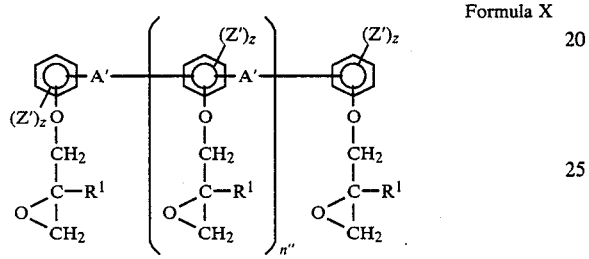

Formula XI

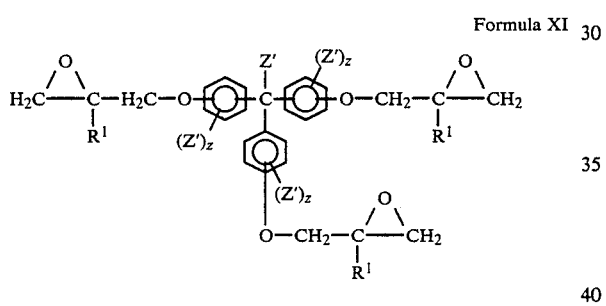

wherein $A^1$ is independently an alkylene group having from 1 to about 10 carbon atoms, —O—, —CO—, —S—, —S—S—, —SO—, —SO$_2$—; each $A'$ is independently an alkylene group having from 1 to about 6 carbon atoms or a

group; $Z'$ is independently hydrogen, a hydrocarbyl or hydrocarbyloxy group having from 1 to about 10 carbon atoms, a halogen, or a phenyl group; each $R^1$ is independently hydrogen or a hydrocarbyl group having from 1 to about 4 carbon atoms; n has a value of zero or 1; n' has a value of from about zero to about 30; n" has a value from about 0.001 to about 6; p has a value from zero to about 10; z has a value of 4; and z' has a value of 3; and (2) at least one mono-olefinically unsaturated monocarboxylic acid, (C) styryl pyridines, and/or their prepolymers or polymers, (D) vinyl styryl pyridines, and/or their prepolymers or polymers, (E) alkenylphenyl cyanates, (F) dicyanates and/or polycyanates, (G) bismaleimides and/or polymaleimides, (H) epoxy resins, (I) alkenylphenol capped styryl pyridines and/or their prepolymers or polymers, (J) allyl styryl pyridines and/or their prepolymers or polymers, (K) styryl pyridine cyanates and/or their prepolmers or polymers, (L) furan capped styryl pyridines and/or their prepolymers or polymers, and (M) alkenylphenyl glycidyl ether capped hydroxystyryl pyridines and/or their prepolymers or polymers.

2. The cured composition of claim 1.

* * * * *